T. KRAUSCH.

Refrigerator-Building.

No. 8,512. Reissued Dec. 3, 1878.

Witnesses

W. C. Corlies

Jno. C. MacGregor

INVENTOR

Theodore Krausch

By Cornwall & Thacher

Attorneys.

N. PETERS, PHOTO-LITHOGRAPHER, WASHINGTON, D. C.

UNITED STATES PATENT OFFICE.

THEODORE KRAUSCH, OF CHICAGO, ILLINOIS.

IMPROVEMENT IN REFRIGERATOR-BUILDINGS.

Specification forming part of Letters Patent No. 186,581, dated January 23, 1877; Reissue No. 8,512, dated December 3, 1878; application filed April 20, 1878.

*To all whom it may concern:*

Be it known that I, THEODORE KRAUSCH, formerly of the city of New York, county and State of New York, but now of the city of Chicago, county of Cook, and State of Illinois, did invent a certain new and useful Improvement in Methods of Preserving Ice in Ice-Houses, which is fully set forth in the following specification, reference being had to the accompanying drawings, in which—

Figure 1:
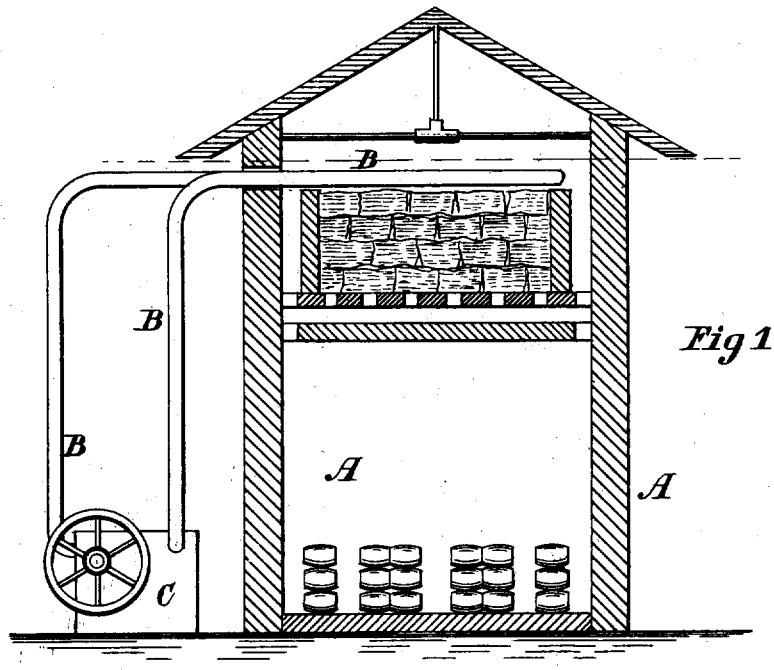
Figure 2:
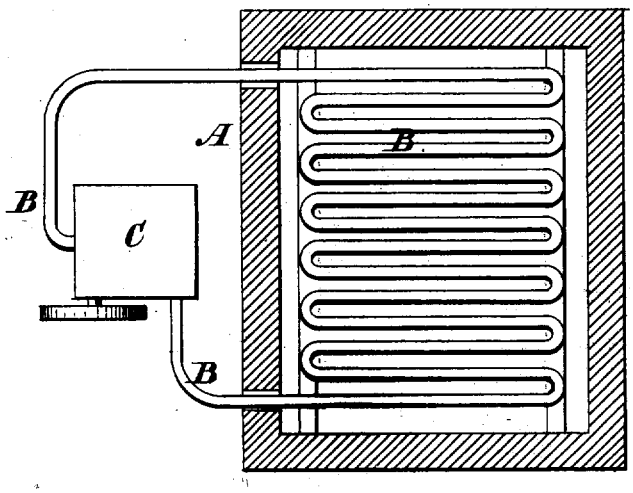

Figure 1 is a vertical sectional view of an ice-house adapted to my improvement. Fig. 2 is a horizontal section thereof.

Similar letters of reference indicate corresponding parts in both figures.

This invention has for its object to permit the use of light structures for ice-houses in place of the very cumbersome devices now deemed necessary.

Ice-houses for brewers, &c., are now usually made with immense receptacles at the upper stories for containing ice, the matter to be cooled being placed on the lower floors; but experience shows that, unless a very large stock of ice is laid in, the structure will become useless after a short while by the melting of the ice; and, also, that it is not practicable to frequently renew the supply of ice in such an ice-house.

My invention consists in combining, with a refrigerator structure cooled by a body of ice within, an independent auxiliary cooling apparatus, by means of which a refrigerant is circulated within the refrigerator, whereby I obtain the combined action of ice and an artificial cooling medium, whereby the quantity of ice necessary to produce the required temperature is very much reduced, although the ice-body is the main reliance for cooling the structure.

In large cooling structures, especially those used by brewers, as heretofore constructed, the necessary expenditure of ice is enormous; but by circulating a refrigerant within the structure the air in the interior thereof will be cool, and therefore the melting of the ice will be retarded. This enables me to use a small quantity of ice with better effect than that with which large quantities can now be utilized, inasmuch as a reduction of temperature to the extent of but a very few degrees, by means of the cooling appliances, will suffice to preserve the whole body of ice and to maintain such a low temperature in the whole apartment as could not otherwise be maintained without a very expensive structure, costly appliances, or a larger body of ice than would be practicable.

It will be apparent that where, from low external temperature or other causes, there is little tendency of the ice to melt, it may not be necessary to maintain the operation of the cooling apparatus, which need only be put into use on those occasional instances where the temperature would result in a destruction of the body of ice.

In carrying my invention into effect, I place in the upper part of an ice-house, A, a proper supply of pieces or cakes of ice, sufficient to cool a given quantity of air contained in said ice-house, which air circulates between the object to be cooled and the ice, coming in actual contact with the latter, as it does in every ice-house. Into this ice-house I conduct one or more pipes, B, containing cooled air or other cooling medium, which pipe extends from a so-called ice-machine, C, the cooling medium circulating or passing through the pipe, and serving to absorb the heat which is liberated in the ice-house, and to prevent the same from affecting and consuming the ice therein contained.

The construction of the ice-machine C, or cooling apparatus, is no part of my present invention; and I do not claim the use of such a machine or apparatus for the purpose of congealing substances, as described in Patent No. 163,576, nor do I claim, broadly, a refrigerator structure in which the air is cooled alone by circulating a refrigerant in the interior, as described in Patent No. 59,396; but, Having described my invention, what I do claim as new, and desire to secure by Letters Patent, is—

A refrigerator structure cooled by ice placed within the structure, in combination with an auxiliary cooling apparatus, by means of which a refrigerant is circulated within the cooling structure to chill the air which comes in contact with the ice, and thereby retard the consumption of the latter, substantially as described.

THEODORE KRAUSCH.

Witnesses:
JNO. C. MACGREGOR,
L. A. BUNTING.